(12) United States Patent
Lopatin et al.

(10) Patent No.: US 11,656,115 B2
(45) Date of Patent: May 23, 2023

(54) METHOD FOR DETERMINING A PROCESS VARIABLE WITH A CLASSIFIER FOR SELECTING A MEASURING METHOD

(71) Applicant: Endress+Hauser Conducta GmbH+Co. KG, Gerlingen (DE)

(72) Inventors: Sergey Lopatin, Lörrach (DE); Dieter Waldhauser, Durach (DE); Thomas Alber, Stuttgart (DE); Philipp Leufke, Rheinfelden (DE); Markus Kilian, Merzhausen (DE); Tobias Brengartner, Emmendingen (DE); Rebecca Page, Basel (CH)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 638 days.

(21) Appl. No.: 16/654,694

(22) Filed: Oct. 16, 2019

(65) Prior Publication Data

US 2020/0124461 A1    Apr. 23, 2020

(30) Foreign Application Priority Data

Oct. 18, 2018  (DE) ..................... 10 2018 125 908.5

(51) Int. Cl.
*G06V 10/70* (2022.01)
*G01F 23/80* (2022.01)
(Continued)

(52) U.S. Cl.
CPC ............ *G01F 23/802* (2022.01); *G01F 23/26* (2013.01); *G01F 23/2962* (2013.01);
(Continued)

(58) Field of Classification Search
CPC .... G06K 9/6232; G06K 9/6277; G06N 20/10; G06N 20/00; G01D 21/00;
(Continued)

(56) References Cited

U.S. PATENT DOCUMENTS

| 6,636,842 B1 * | 10/2003 | Zambrano | ............... G05B 17/02 |
| | | | 706/46 |
| 7,424,395 B2 * | 9/2008 | Emigholz | .......... G05B 23/0254 |
| | | | 702/182 |

(Continued)

FOREIGN PATENT DOCUMENTS

| CN | 103440478 A | 12/2013 |
| DE | 102007021099 A1 | 11/2008 |

(Continued)

*Primary Examiner* — Ian L Lemieux
(74) *Attorney, Agent, or Firm* — Kelly J. Smith; Endress+Hauser (USA) Holding Inc.

(57) ABSTRACT

The present disclosure relates to a method for determining at least one process variable of a medium. The method includes steps of recording a first value for the process variable by means of a first method for determining the process variable and recording a second value for the process variable by means of a second method for determining the process variable. The method also includes steps of selecting at least one of the detected values for the process variable by means of a classifier and outputting the selected value for the process variable. The present disclosure further relates to a computer program designed for executing a method according to the present disclosure, and to a computer program product having a computer program according to the present disclosure.

13 Claims, 4 Drawing Sheets

(51) Int. Cl.
*G06N 20/10* (2019.01)
*G06V 10/75* (2022.01)
*G01F 23/26* (2022.01)
*G01F 23/2962* (2022.01)
*G06F 18/213* (2023.01)
*G06F 18/2415* (2023.01)
*G06N 20/00* (2019.01)
*G01F 23/296* (2022.01)
*G01N 27/416* (2006.01)
*G01D 21/00* (2006.01)
*G01N 21/55* (2014.01)

(52) U.S. Cl.
CPC ........ *G06F 18/213* (2023.01); *G06F 18/2415* (2023.01); *G06N 20/10* (2019.01); *G06V 10/751* (2022.01); *G06V 10/87* (2022.01); *G01D 21/00* (2013.01); *G01D 2207/00* (2021.05); *G01F 23/2966* (2013.01); *G01N 21/55* (2013.01); *G01N 27/4165* (2013.01); *G06N 20/00* (2019.01)

(58) Field of Classification Search
CPC . G01D 2207/00; G01F 23/26; G01F 23/2962; G01F 23/2966; G01F 23/802; G01N 21/55; G01N 27/4165; G06V 10/751
See application file for complete search history.

(56) References Cited

U.S. PATENT DOCUMENTS

| | | | | |
|---|---|---|---|---|
| 10,864,037 | B2* | 12/2020 | Mun | A61B 18/1445 |
| 2012/0136261 | A1* | 5/2012 | Sethi | A61B 5/02125 |
| | | | | 600/485 |
| 2014/0180136 | A1* | 6/2014 | Su | A61B 5/02416 |
| | | | | 600/479 |
| 2015/0316397 | A1* | 11/2015 | Wittmer | G01N 27/4165 |
| | | | | 73/1.01 |
| 2018/0129947 | A1* | 5/2018 | Cambot | G06N 20/00 |
| 2018/0284758 | A1* | 10/2018 | Cella | G05B 19/4185 |
| 2019/0058715 | A1* | 2/2019 | Abbaszadeh | H04L 63/1416 |
| 2019/0176326 | A1* | 6/2019 | Bingham | B25J 9/161 |
| 2019/0371465 | A1* | 12/2019 | Hilbert | G06N 20/00 |
| 2019/0384239 | A1* | 12/2019 | Murugesan | G05B 13/028 |

FOREIGN PATENT DOCUMENTS

| | | |
|---|---|---|
| DE | 102008045840 A1 | 3/2010 |
| DE | 102012107214 A1 | 2/2014 |
| DE | 102012112782 A1 | 6/2014 |
| DE | 102012112784 A1 | 6/2014 |
| GN | 106980873 A | 7/2017 |
| KR | 20170007590 A | 1/2017 |

* cited by examiner

Fig. 4 though they have different measuring accuracies, different measuring principles for determining one and the same process variable differ in reliability and are fundamentally differently well suited. For example, for certain applications the respective process variable can be more suitably determined either with or without direct contact between at least one component of the sensor unit and the medium. The measuring principle that is applied also depends on the process in question, including the medium selected.

METHOD FOR DETERMINING A PROCESS VARIABLE WITH A CLASSIFIER FOR SELECTING A MEASURING METHOD

CROSS-REFERENCE TO RELATED APPLICATION

The present application is related to and claims the priority benefit of German Patent Application No. 10 2018 125 908.5, filed on Oct. 18, 2018, the entire contents of which are incorporated herein by reference.

TECHNICAL FIELD

The present disclosure relates to a method for determining a process variable of a medium with a classifier for the selection of a measurement method. The present disclosure furthermore relates to a computer program for determining the process variable, and to a computer program product with a corresponding computer program.

BACKGROUND

Field devices for determining, monitoring, and/or influencing various process variables are frequently used in process and/or automation technology. Examples of such field devices or measuring devices are fill level measuring devices, flow rate measuring devices, pressure and temperature measuring devices, pH and/or pH redox potential measuring devices, and/or conductivity measuring devices, which serve to detect the respective corresponding process variables, such as a fill level, a flow rate, the pressure, the temperature, a pH value, a redox potential, or a conductivity. The respective underlying measuring principles are well known from the prior art and are not listed individually at this point. Flow-measuring devices are, in particular, Coriolis, ultrasound, vortex, thermal, and/or magnetically inductive flow-measuring devices. Fill-level measuring devices are, in particular, microwave fill-level measuring devices, ultrasonic fill-level measuring devices, time domain reflectometry fill-level measuring devices (TDR), radiometric fill-level measuring devices, capacitive fill-level measuring devices, conductive fill-level measuring devices, and/or temperature-sensitive fill-level measuring devices. The pressure measuring devices, on the other hand, are preferably what are known as absolute, relative, or differential pressure devices, whereas temperature measuring devices often have thermocouples or temperature-dependent resistors for determining the temperature.

Within the scope of the present application, all devices that are arranged at the field level, i.e., are used close to the process and provide or process process-relevant information, are in principle referred to as field devices. In addition to sensors and actuators, units that are directly connected to a field bus and used for communication with a control unit, such as a control system, e.g., remote I/O's, gateways, linking devices, and wireless adapters or radio adapters, are also generally referred to as field devices. The companies of the Endress+Hauser Group produce and distribute a large variety of such field devices.

As regards a specific process variable, there are often many different ones. Measurement principles for their determination are available, as has already been mentioned to some extent. The different measurement principles then often have different measurement accuracies for different applications, including different media, or are suitable to a different extent for different reasons. In addition to different In this context, different uses or applications relate to the determination of a process variable for different media having different physical and/or chemical properties.

SUMMARY

The present disclosure is based on the object of increasing the field of use or application for a field device in an efficient manner.

This object is achieved by the method of the present disclosure, the computer program of the present disclosure, and the computer program product of the present disclosure.

With regard to the method, the object forming the basis of the present disclosure is achieved by a method, such as a computer-implemented method, for determining at least one process variable of a medium. The method includes steps of recording a first value for the process variable by means of a first method for determining the process variable and recording a second value for the process variable by means of a second method for determining the process variable. The method also includes steps of selecting at least one of the recorded values for the process variable by means of a classifier and outputting the selected value for the process variable.

The two measuring methods thereby serve to determine the same process variable. The respective process, including the respective medium, is characterized by predefinable process and/or media parameters, such as various predefinable physical and/or chemical properties of the process and/or of the medium. The different methods or measurement principles are of varying suitability for different value ranges of these process and/or media parameters, for example with regard to measurement accuracy, reliability, and/or also with regard to the general suitability for the respective application. For a measurement, a first and a second value for the process variable are therefore determined according to the present disclosure by means of the first and second method.

The classifier then advantageously serves for selection, such as automatic selection, of the respective value selected for the process variable. The process variable is determined by means of at least two different methods. This usually results in the first and second value for the process variable differing from each other. The classifier then selects the respective appropriate value, for example the value with the highest measurement accuracy or the value suitable for the respective application. Namely, it can occur that, with a specific method for a specific application or for a specific process, no meaningful value at all for the process variable can be determined with one of the at least two measurement methods, for example because an application of the method is precluded for certain media. In this instance, this value is not selected.

It is also conceivable that the two measurement principles differ with regard to the measurement accuracy and to the determination speed for determining a value for the process variable. Depending on requirements in the ongoing process, the sensor with fast or slow or high or low measurement accuracy can then be respectively selected. This may be advantageous if, at least intermittently, a control process depends on the respective selected value for the process variable.

In one embodiment, the classifier is designed to learn the selection of at least one of the recorded values for the process variable. The classifier is accordingly a unit equipped with artificial intelligence and learns to choose a selected value for the process variable. This is therefore an intelligent selection of the value for the process variable. The machine learning process which the classifier runs through can thereby be both a supervised learning process and an unsupervised learning process.

In another embodiment, the classifier is trained offline and/or online. Offline training is understood to mean a training before implementation of the method, that is to say before the method according to the present disclosure is used for determining a value for a process variable. In principle, this involves training under laboratory conditions. Instead or additionally, however, the classifier can also be trained online, i.e. in the ongoing process or during the implementation of the method in the process.

In addition, depending on whether a training is performed online or offline, different types of training may be advantageous. In online training, for example, the method of self-organized maps is preferred. In an offline training, the method of time series analysis can be used in turn, for example. This method is comparatively complex and thus, for example, is less well suited for an online training.

In one embodiment of the method, when choosing the selected value for the process variable, the classifier is designed to take into account at least one influencing variable, such as the sensor signal, or a variable derived from the sensor signal. The influencing variable may also be a process parameter and/or an environmental parameter, for example a physical or chemical property of the medium and/or of the environment. The sensor signal in turn is, for example, an output signal of a sensor unit of a field device.

In one embodiment of the method, a data set comprising at least one input variable and one output variable associated with the input variable is used to create a map, such as a numerical map, based on which map the classifier determines the selected value. This embodiment is particularly suitable if the classifier performs a supervised learning process.

In a further embodiment of the method, a feature vector is determined, wherein the classifier is designed to select the selected value on the basis of the feature vector.

In this regard, it is advantageous if a first and a second classifier are used, wherein the first classifier is used for performing a feature extraction and/or for creating a feature vector, and wherein the second classifier is used for choosing the selected value on the basis of the feature vector. The embodiment with a first and a second classifier may, in turn, be suitable for an at least partially unsupervised learning process of the classifier. In an unsupervised learning process, the first classifier learns how to extract the feature vector, whereas the second classifier can operate in a supervised learning process, for example.

A particularly preferred embodiment of the method according to the present disclosure includes determining at least one value for the process variable by means of a soft sensor. At least one method for determining the process variable is accordingly carried out by calculation. The soft sensor can, for example, be implemented in an electronic unit of a field device, or also in a higher-level unit. Advantageously, for example, a single measuring device can additionally be equipped with at least one soft sensor, so that a plurality of measuring methods is available with a single field device.

Another embodiment includes determining at least one value for the process variable by means of a device for determining and/or monitoring the process variable.

For example, at least one first value for the process variable is determined or measured by means of a field device, and at least one second value for the process variable is determined by means of a soft sensor. However, a plurality of field devices and/or soft sensors can also be used.

A further embodiment includes determining a classification quality with respect to the selection of the selected value for the process variable, such as on the basis of a probability with regard to the selection of the selected value for the process variable. With this embodiment, for example, it is possible to check the decisions of the classifier with regard to the selection of the selected value. A classification quality can be determined, such as, for example, on the basis of a softmax function.

It is advantageous if at least a first and a second value for the process variable, or a first and second value derived from the first and second value for the process variable, such as a noise, are compared with each other. A classification quality can likewise be determined on the basis of such a comparison. It is also possible to make a statement regarding the determination of the first and/or second value by means of the first and/or second method.

Yet another embodiment of the method according to the present disclosure includes performing a status monitoring, such as a status monitoring of at least one soft sensor or a device for determining and/or monitoring the process variable. For example, the various values determined for the process variable by the various methods may be compared with each other. A deviation of one value from the other values that exceeds a predefinable limit value can then be an indicator of a defect of the corresponding measuring device or of the corresponding sensor.

A further embodiment of the method includes the process variable being a fill level of a medium in a container, a flow rate of a medium through a pipe, a conductivity of a medium, or a concentration of a substance contained in a medium. However, other process variables of a medium, some of which are listed by way of example in the specification preamble, can also be determined by means of the method according to the present disclosure.

The object forming the basis of the present disclosure is further achieved by a computer program for determining at least one process variable of a medium with computer-readable program code elements which, when executed on a computer, cause the computer to execute at least one embodiment of the method according to the present disclosure.

The object forming the basis of the present disclosure is likewise achieved by a computer program product having a computer program according to the present disclosure and at least one computer-readable medium on which at least the computer program is stored.

It should be noted that the embodiments described in connection with the method according to the present disclosure also apply, mutatis mutandis, to the computer program according to the present disclosure and to the computer program product according to the present disclosure.

The present disclosure offers the possibility of increasing the measurement accuracy in the determination of a process variable, and of increasing or expanding the respective field of application by combining different measurement principles for determining a process variable. In addition, it is possible to continuously compare and evaluate the different measurement principles with respect to each other. This also leads to a lower probability of failure with regard to the determination of the process variable.

BRIEF DESCRIPTION OF THE DRAWINGS

The present disclosure is explained in greater detail with reference to the following Figures.

DETAILED DESCRIPTION

In Figures, identical elements are respectively given the same reference characters.

Figure 1A:
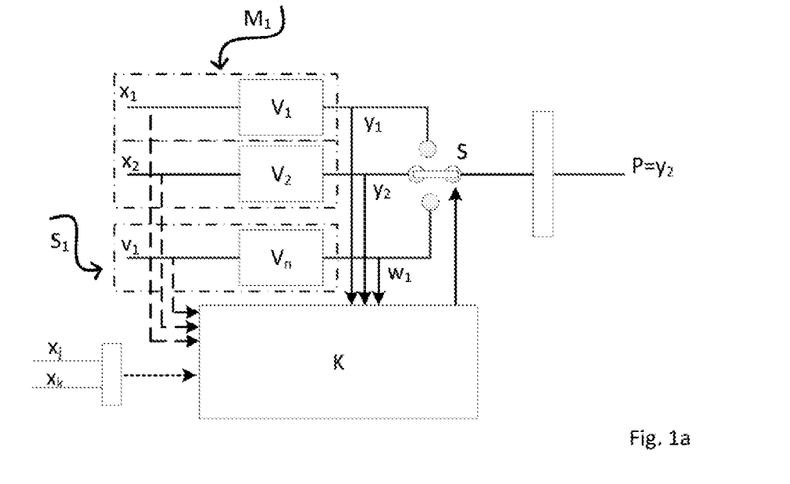
FIG. 1a shows a block diagram for illustrating the method according to the present disclosure.

The method according to the present disclosure is schematically illustrated in FIG. 1. The method can, for example, on the one hand be implemented in the electronic unit of a field device $M_1$-$M_n$ (with $M_1$ being shown), or also in a higher-level unit. According to the present disclosure, values $y_1$-$y_i$ (with $y_1$ and $y_2$ being shown) for a process variable P are respectively determined by means of the methods based on the sensor signals $x_1$-$x_i$ (with $x_1$ and $x_2$ being shown). $x_1$ and $V_1$, or $x_2$ and $V_2$, are respectively part of a device $M_1$ or $M_2$ for determining the process variable P by means of the method or measuring method $V_1$ and $V_2$. Furthermore, in addition to the devices $M_1$-$M_n$, a soft sensor $S_1$ is optionally shown here by way of example, which soft sensor $S_1$ also determines a value $w_1$ for the process variable based on the input variable $v_1$, by means of the measuring method $V_n$.

Depending on the embodiment, all measuring methods $V_1$-$V_n$ can be computational methods. All measuring methods $V_1$-$V_n$ can also be metrological methods. As is shown using the example from FIG. 1, said methods can also be partially computational methods $V_n$ and partially metrological methods $M_1$, $M_2$.

According to the present disclosure, the classifier K serves for determining and/or selecting a selected value (here $y_2$) for the process variable P from the set of the determined values $y_1$-$y_i$, $w_1$ for the process variable. For this purpose, the determined values $y_1$-$y_i$, $w_1$ are supplied to the classifier K. The selection of the classifier is illustrated in FIG. 1 by the switching element S, which is controlled by the classifier K. The selected value $y_2$ is then output as a value for the process variable P.

Optionally, one or more influencing variables can be made available to the classifier K, as indicated by the dashed arrows. In the present instance these are, for example, the sensor signals $x_1$-$x_i$, an input variable $v_1$ of the soft sensor $S_1$, as well as the other influencing variables $x_j$ and $x_k$. These can be provided, for example, by process parameters, media parameters, and/or environmental parameters.

The different methods $V_1$-$V_n$ are typically differently well suited to different applications, measurement ranges, or the like. For example, the various methods may cover different combinational configurations in the process, or different application fields, or different media. Individual methods may also not be applicable to certain applications, so that a selection of the corresponding value for the process variable P can be excluded in these instances.

Figure 1B:
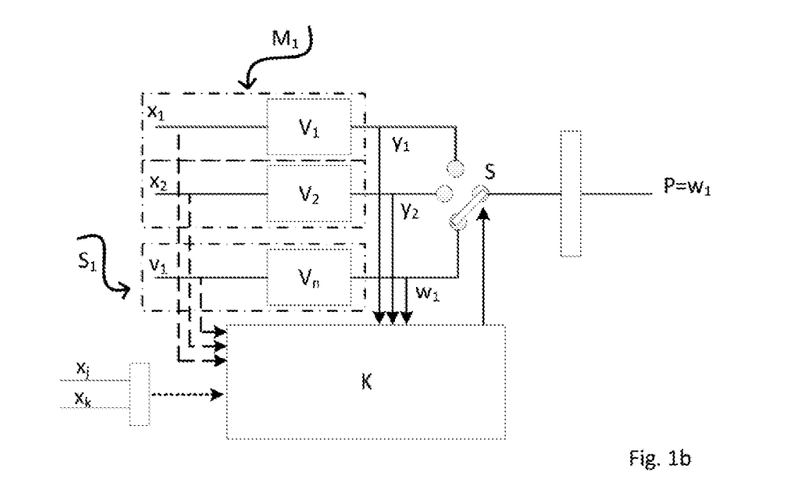
FIG. 1b shows a block diagram for illustrating the method according to the present disclosure.

In the simplest instance, the respective selected value or the selection of the selected value remains the same for a predefinable duration of a particular process. However, it is also conceivable that process and/or environmental conditions change during continuous operation in such a way that a change in the selection by the classifier K is to be performed continuously, periodically, or selectively. For example, in the instance of FIG. 1b, a change in selection from the value $y_2$ to the selected value $w_1$ by the classifier K has taken place, which is then output as the value $w_1$ for the process variable P.

Figure 2A:
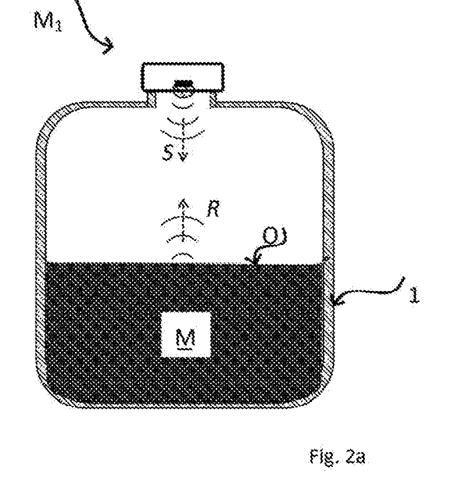
FIG. 2a illustrates a possible application in connection with the determination of a fill level of a medium.

A possible application of the method according to the present disclosure with regard to the determination of a fill level F of a medium M as a process variable P is illustrated in FIG. 2. The transit time-based fill level measuring method $V_1$ known per se from the prior art is used as the first measuring method $V_1$, as is illustrated in FIG. 2a. Corresponding field devices $M_1$ are manufactured by the applicant in many different embodiments and are sold, for example, under the names Micropilot, Levelflex, or Prosonic.

A transmission signal S is reflected at a surface O of a medium M located in a container 1, and the received echo signal R is then evaluated with respect to the fill level F of the medium M. Different field devices $M_1$, $M_2$ operating according to the transit time-based fill level measurement method $V_1$ typically have different measurement ranges with regard to the determinable fill levels within the container 1. The measuring range here is understood to be a specific height range $\Delta h$ within the container 1 within which the fill level can be determined on the basis of the two field devices $M_1$ and $M_2$. The two measuring devices $M_1$ and $M_2$ cover different measurement ranges $\Delta h_1$ and $\Delta h_2$ within the container.

Figure 2B:
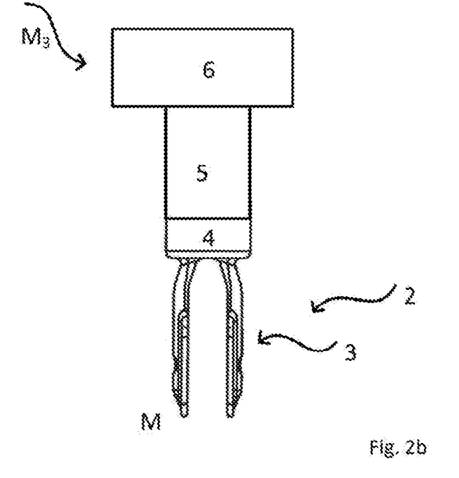
FIG. 2b illustrates a possible application in connection with the determination of a fill level of a medium.

However, neither of the measuring devices $M_1$ or $M_2$ is suitable in order to be able to determine the fill level in the event of an almost completely filled container. A further measuring device $M_3$ can be used here, for example a vibronic sensor $M_3$ as shown in FIG. 2b. Such a field device $M_3$ operates on the vibronic measuring principle $V_3$ (not specifically shown, but represented as $V_n$), which is likewise known from the prior art. Corresponding field devices are also manufactured by the applicant in many different embodiments and are sold under the names LIQUIPHANT or SOLIPHANT.

The vibronic sensor $M_3$ comprises a sensor unit 2 with a mechanically oscillatory unit 3 in the form of a vibration fork. The mechanically oscillatory unit 3 is excited to mechanical oscillation by means of the drive/receiving unit 4. Furthermore, the drive/receiving unit 4 is used to receive mechanical oscillations of the vibration fork 3 by means of which the fill level of the medium can be determined and/or monitored. Furthermore, an electronic unit 6 that follows on a neck tube 5 is shown, by means of which signal evaluation and/or signal feed takes place.

Figure 2C:
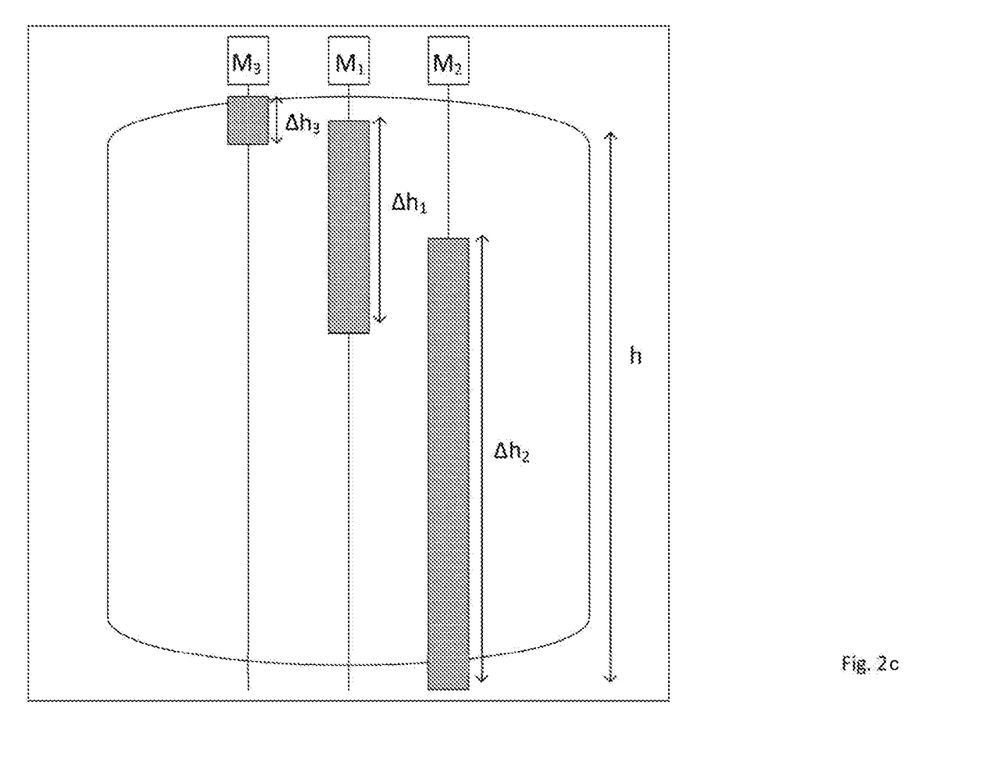
FIG. 2c illustrates a possible application in connection with the determination of a fill level of a medium.

The three measuring devices $M_1$-$M_3$ cover different measuring ranges $\Delta h_1$-$\Delta h_3$. Together, they enable the fill level to be determined over the entire height h of the container 1, as illustrated in FIG. 2c. As can be seen there, for the shown example the different measuring ranges $\Delta h_1$-$\Delta h_3$ partially overlap. The classifier now respectively serves to choose a selected value for the process variable on the basis of the values $y_1$-$y_3$ (with $y_3$ not explicitly shown) determined by the three measuring devices $M_1$-$M_3$ for the process variable P. If the fill level is low, for example, the measuring device $M_2$ should be selected, and thus the selected value $y_2$ for the process variable P.

A further exemplary application of the method according to the present disclosure relates to the determination of the process variable of the conductivity σ of a medium M. In this respect, for example, the conductive and inductive measuring methods have become known from the prior art. Corresponding field devices are produced and marketed by the applicant under the name Condumax or Indumax, for example.

Figure 3A:
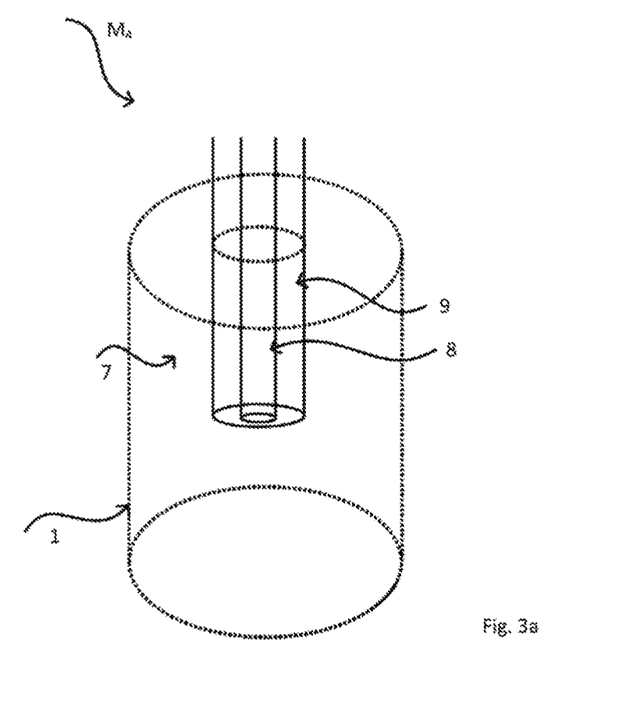
FIG. 3a illustrates a possible application in connection with determining a conductivity of a medium.

A measuring device $M_4$ operating on the conductive measuring principle $V_4$ (not specifically shown, but represented as $V_n$) is shown in FIG. 3a. The measuring device $M_4$ comprises a sensor element 7 protruding into the container 1, having an inner electrode 8 and an outer electrode 9 which are electrically isolated from one another. In order to determine the conductivity of the medium, such as the electrolytic conductivity, the resistance or conductance of the measured section in the medium M is determined.

Figure 3B:
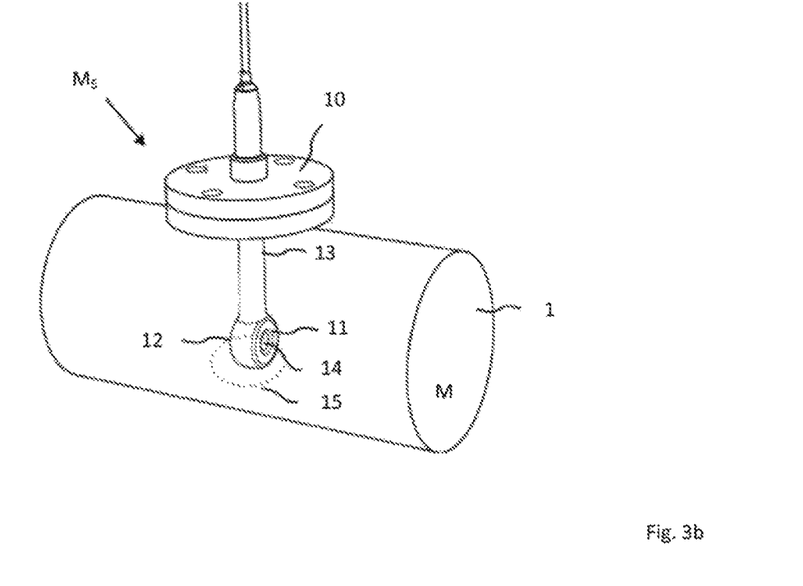
FIG. 3b illustrates a possible application in connection with determining a conductivity of a medium.

A measuring device $M_5$ operating on the inductive measuring principle $V_5$ (not specifically shown, but represented as $V_n$) is in turn drawn in FIG. 3b. The sensor $M_5$ is introduced via a process connection 10 into the container 1 in which the medium M is located. The sensor $M_5$ comprises a transmitter coil 11 and a receiver coil 12 that are arranged in a housing 13. In an end region facing toward the medium M, the housing 13 forms a channel 14 into which the medium M can penetrate. The coils 11, 12 and the channel are thereby arranged in such a way that a closed current path 15 passing through both coils can form in the medium M. If the transmitter coil is charged with an alternating voltage, a magnetic field is generated which induces the current path 15 and whose strength depends on the conductivity σ of the medium M.

The typical areas of application for a conductive conductivity sensor $M_4$ and an inductive conductivity sensor $M_5$ typically differ depending on the conductivity σ of the medium M. The conductive measuring principle $V_4$ is suitable for media with a lower conductivity σ, such as in the range of 0.04 μS/cm-200 mS/cm, whereas the inductive measuring principle $V_5$ is to be preferred for media with a greater conductivity, such as in the range of 2 μS/cm-2000 mS/cm.

Here, the method according to the present disclosure is suitable. The classifier K can respectively suitably select a measured value $y_4$ or $y_5$ (with $y_4$ and $y_5$ not explicitly shown) for the conductivity σ of the medium M, so that a measured value that is as accurate as possible can be determined as a selected value, independently of the medium in question.

It should be noted that the considerations mentioned in connection with FIG. 3 can also be transferred, mutatis mutandis, to the determination of a fill level of a medium according to the capacitive and conductive measurement principles.

Figure 4:
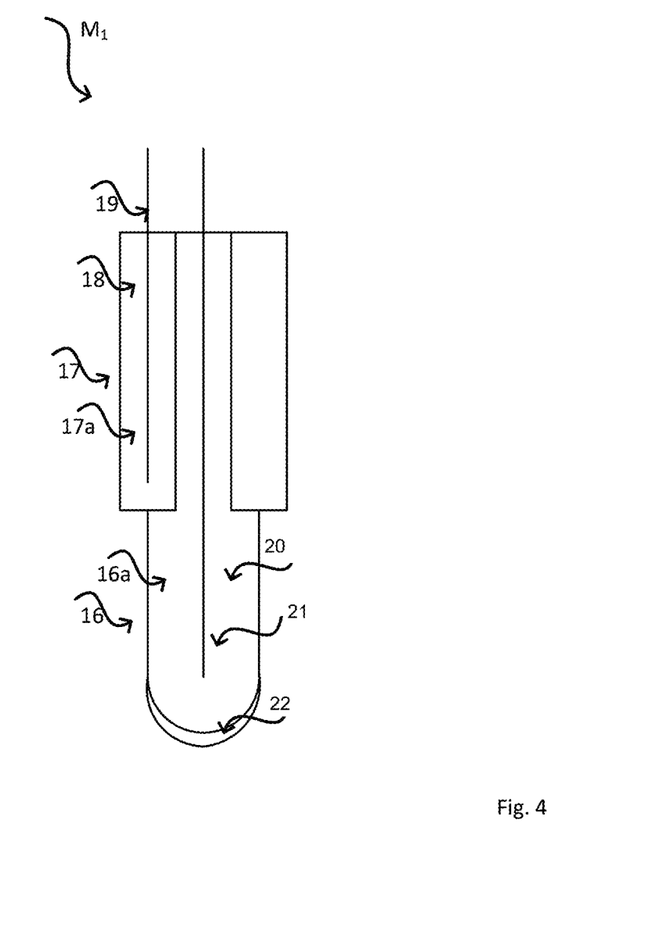
FIG. 4 shows a possible application in connection with determining the pH value of a medium.

A further possible application of the method according to the present disclosure in connection with a soft sensor relates to the measurement of the pH value of a medium. A widespread measuring method relates to the pH measurement method which is very well known per se from the prior art, by means of a pH sensor designed as a potentiometric combined electrode. Corresponding measuring devices are likewise produced by the applicant in many embodiments and are sold under the names Memosens or Orbisint. A combined electrode of a pH sensor $M_1$ is schematically illustrated in FIG. 4. The combined electrode $M_1$ is of a rod-shaped design and comprises a measuring half-cell 16 with an outer chamber 16a and a reference half-cell 17 with an inner chamber 17a, which reference half-cell 17 is arranged coaxial to the measuring half-cell 16 and surrounds it in segments. The reference half-cell 17 comprises a reference electrode 18 and a reference electrolyte 19, whereas the measuring half-cell 16 comprises a measuring electrode 20 and an inner electrolyte 21. Furthermore, the measuring half-cell 16 has a media-contacting glass membrane 22 which is terminally arranged at the combined electrode 1. However, problems can arise given the use of glass electrodes, such as in the event of high-purity water such as, for example, in steam circuits in the power plant sector. As time passes, it may happen that, among other things, ions of the electrolyte pass into the medium, which has a negative effect on the measurement of the pH value.

Another measurement method for determining the pH value is what is known as differential conductivity measurement, also known from the prior art. The conductivity of the medium before and after passing through a cation exchanger is hereby determined. The cation exchanger typically contains a resin regenerated with sulfuric acid. By means of a suitable formula, the pH value can be determined by calculation from the two values for the conductivity. This in turn can be realized by means of a suitable soft sensor, for example. The formula to be used will depend on, among other things, the respective particular chemical reaction taking place in the process or in the cation exchanger.

Whether a determination of the pH value by means of a pH sensor or by means of a differential conductivity measurement is more suitable now depends on various factors, for example on the purity of the medium. The method according to the present disclosure could be used in this context. The classifier K can respectively suitably select a measured value for the pH, so that the highest possible measurement accuracy can be achieved independently of the medium M.

The invention claimed is:

1. A method for determining at least one process variable of a medium, including the following method steps:
   recording a first value for the process variable by means of a first method for determining the process variable;
   recording a second value for the process variable by means of a second method for determining the process variable;
   selecting at least one of the recorded values for the process variable using a classifier, wherein the classifier selects the at least one of the recorded values for the process variable based on process parameters, medium parameters and/or environmental parameters;
   outputting the selected value for the process variable;
   determining a feature vector;
   designing the classifier to select the selected value for the process variable based on the feature vector; and
   further including using a first and a second classifier, wherein the first classifier performs a feature extraction and/or creates the feature vector, and wherein the second classifier selects the selected value for the process variable based on the feature vector.

2. The method of claim 1, wherein the classifier is designed to learn the selection of at least one of the recorded values for the process variable.

3. The method of claim 2, wherein the classifier is trained online or offline.

4. The method of claim 1, wherein the classifier selects the selected value for the process variable based in part on at least one influencing variable.

5. The method of claim 1, further including creating a map used by the classifier to determine the selected value, wherein the map is created based on a data set, wherein the data set includes at least one input variable and an output variable associated with the input variable.

6. The method of claim 1, further including determining at least one value for the process variable using a soft sensor.

7. The method of claim 1, further including determining at least one value for the process variable using a device for determining or monitoring the process variable.

8. The method of claim 1, further including determining a classification quality in relation to the selection of the selected value for the process variable based on a probability in relation to the selection of the selected value for the process variable.

9. The method of claim 1, further including comparing at least a first and a second value for the process variable or a first and a second value derived from the first and second values for the process variable with one another.

10. The method of claim 1, further including performing a status monitoring of at least one soft sensor or one device for determining or monitoring the process variable.

11. The method of claim 1, wherein the process variable is a fill level of the medium in a container, a flow rate of the medium through a pipe, a conductivity of the medium, or a concentration of a substance contained in the medium.

12. A method for determining at least one process variable of a medium, including the following method steps:
    recording a first value for the process variable by means of a first method for determining the process variable;
    recording a second value for the process variable by means of a second method for determining the process variable;
    selecting at least one of the recorded values for the process variable using a classifier;
    outputting the selected value for the process variable;
    determining a feature vector;
    designing the classifier to select the selected value for the process variable based on the feature vector; and
    further including using a first and a second classifier, wherein the first classifier performs a feature extraction and/or creates the feature vector, and wherein the second classifier selects the selected value for the process variable based on the feature vector.

13. A non-transitory computer-readable medium storing a program including instructions that, when executed by a processor, cause a computer to determine at least one process variable of a field device including steps of:
    recording a first value for the process variable by means of a first method for determining the process variable;
    recording a second value for the process variable by means of a second method for determining the process variable;
    selecting at least one of the recorded values for the process variable using a classifier wherein the classifier selects the at least one of the recorded values for the process variable based on process parameters, medium parameters and/or environmental parameters;
    outputting the selected value for the process variable;
    determining a feature vector;
    designing the classifier to select the selected value for the process variable based on the feature vector; and
    further including using a first and a second classifier, wherein the first classifier performs a feature extraction and/or creates the feature vector, and wherein the second classifier selects the selected value for the process variable based on the feature vector.

* * * * *